UNITED STATES PATENT OFFICE.

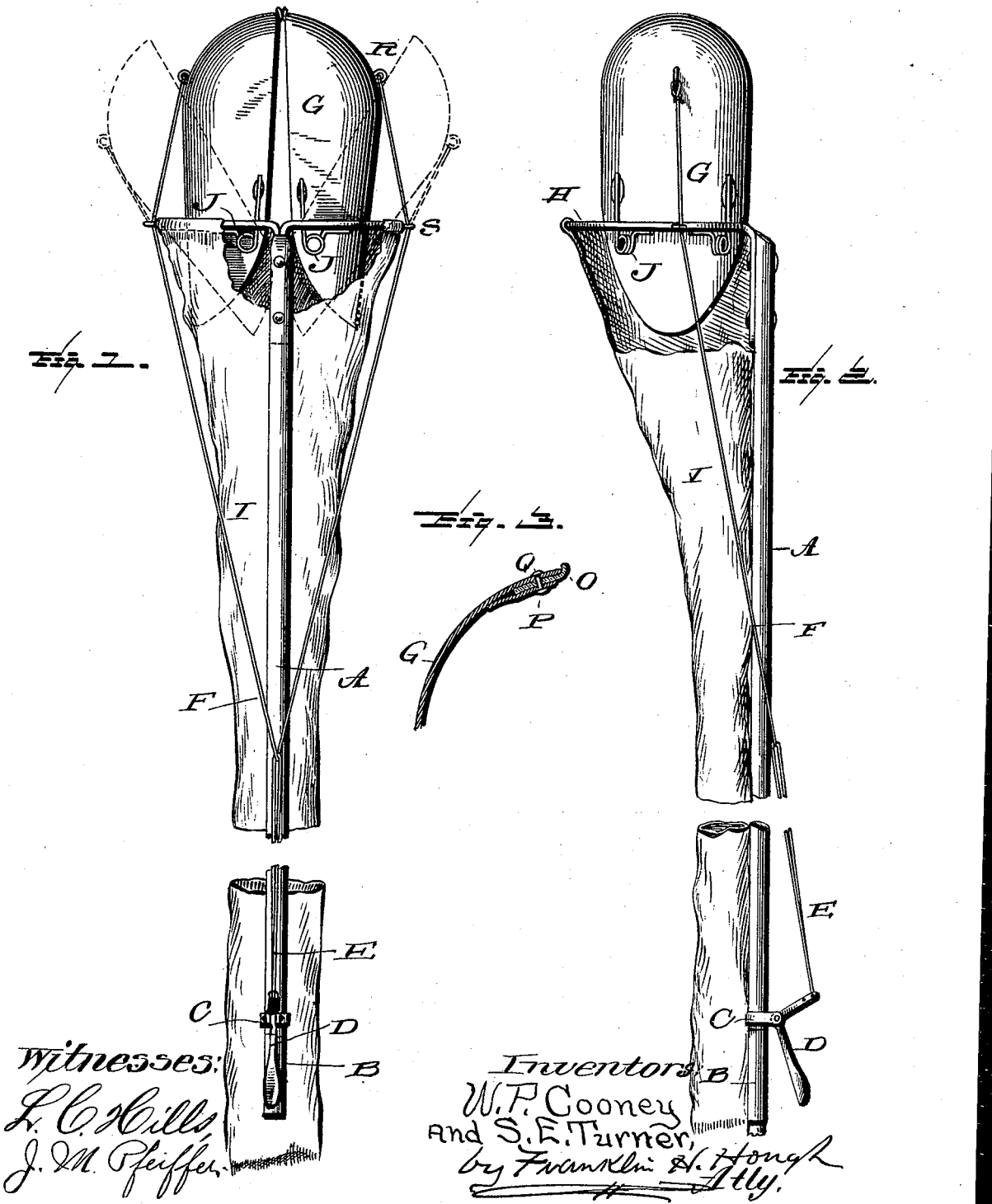

WILLIAM PATISON COONEY AND SAMUEL EDSOL TURNER, OF PRIDEMORE, VIRGINIA.

FRUIT-PICKER.

SPECIFICATION forming part of Letters Patent No. 583,567, dated June 1, 1897.

Application filed September 23, 1896. Serial No. 606,770. (No model.)

*To all whom it may concern:*

Be it known that we, WILLIAM PATISON COONEY and SAMUEL EDSOL TURNER, citizens of the United States, residing at Pridemore, in the county of Lee and State of Virginia, have invented certain new and useful Improvements in Fruit-Pickers; and we do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in fruit-gatherers; and it relates more particularly to that class of devices which are intended for use in picking apples, oranges, and other fruits directly from the tree and in transferring the same through an open sack or tube of canvas or other like material, whereby the fruit may be gathered without danger of bruising or otherwise injuring the same.

The invention has for a further and more immediate object the provision of a device of the character described which is adapted for use in selecting and detaching from the tree fruits which it may be desired to remove without disturbing the other fruits remaining upon the tree.

To these ends and to such others as the invention may pertain the same consists in the peculiar construction and in the novel arrangement, combination, and adaptation of parts, all as more fully hereinafter described, and shown in the accompanying drawings, and then specifically defined in the appended claim.

The invention is clearly illustrated in the accompanying drawings, which, with the letters of reference marked thereon, form a part of this specification, like letters indicating the same parts throughout the several views, and in which drawings—

Figure 1 is a side view of a fruit-picker embodying our invention, the picking cups or jaws being shown in solid lines as closed and their position when open being indicated in dotted lines. Fig. 2 is a side view of the device with a portion of the sack or tube removed or broken away in order to better illustrate the parts. Fig. 3 is a vertical section taken through one of the cups.

Reference now being had to the details of the drawings by letter, A represents the supporting-rod, which may be made of any desired length and which preferably has a ferrule B secured upon its lower end, so that other sections of rods can be added, according to the height of the tree from which the fruit is to be gathered. Secured directly to the ferrule is the ring C, upon which the angular lever D is pivoted, and which ring and lever are intended to be made to form virtually a part of the ferrule, so that when the ferrule is detached from one section the ring and lever may be transferred at the same time. Extending from the upper end of this lever D is an operating wire, cord, or chain E, of any suitable length, and which connects at its upper end with the wire F, connected to the two cups G. The wire is formed of a single piece, its upper ends being attached to the cups G by means of the rings R near their upper ends and its lower portion forming a loop or double portion in which the wire E catches. This wire is guided in its movement by the loops S, formed upon opposite sides of the ring H.

Secured to the upper end of the rod A is a wire loop H, to which the upper end of the sleeve or sack I is secured and to which the lower ends of the operating-springs J are fastened. This ring or loop H is sufficiently large to receive the lower ends of the two cups G and allow them to open to their fullest extent. Each of the springs J is coiled at a suitable point between its ends, and the upper end extends along the outer side of the cups G, while the lower end is secured directly to the ring H. Preferably two springs are used for each cup, and the springs are arranged near the edges of the cups, as shown. The springs have their ends secured to both cups and the ring. Therefore all the strain upon them comes upon the coiled portion, and hence there is little or no danger of their being injured by use.

The cups G are preferably made of the form herein shown, and, as shown in Fig. 3, the upper edge of each one has a leather or other suitable guard O secured thereto to prevent the fruit from being injured while being picked. These guards O consist of flat pieces of leather, rubber, felt, or other suitable material and are held between the top edge of the cup and an additional piece of material P, which is applied to the inner side of the top edge, and then the three parts are secured together by the rivets Q, which are passed through them. If the edges of the cups were not guarded, they would be apt to injure and bruise the fruit in detaching it from the tree.

In using our invention the rod A is made of a length corresponding to the height of the tree from which the fruit is to be picked, and the cups G are opened by operating the angular lever D in the usual manner. After the cups have been placed over the fruit the lever D is released, and the springs J cause the cups to instantly close, and then a slight pull is sufficient to detach the fruit, which falls into the sleeve I and is directed into any desired receptacle or to the ground without being bruised or injured.

It will be seen from the construction above described that the cups are attached to the ring H by means of the springs only, and the springs are fastened in such a way that no ordinary amount of use is liable to break or injure them. The wire F being formed from a single piece, the guides through the loops S exert a direct pull upon the upper ends of the cups, so as to open them with the least possible strain and sufficiently wide to take in the largest fruit that is to be gathered.

Having thus described our invention, what we claim to be new, and desire to secure by Letters Patent, is—

In a fruit-gatherer, the combination with the hoop, mounted on a suitable pole, of the scoop-shaped jaws G, having secured near the edges of each, on opposite sides thereof, the springs J, the said springs having their other ends attached to the said hoop, the upper curved edges of the jaws being recessed to receive the cushioned strips O, of the rings R and cord for operating the jaws, all substantially as shown and described.

In testimony whereof we affix our signatures in presence of two witnesses.

WILLIAM PATISON COONEY.
SAMUEL EDSOL TURNER.

Witnesses:
CHARLEY WARHOLM,
MATTISON COONEY.